(12) United States Patent
Turner

(10) Patent No.: US 6,792,371 B1
(45) Date of Patent: Sep. 14, 2004

(54) DEVICE AND METHOD FOR CALIBRATING A WEIGHING APPARATUS

(76) Inventor: Philip John Turner, Yew Cottages, 78 The Street, Rotherwick, Hook (GB), RG27 9BG ( * ) Notice: Subject to any disclaimer, the term of this patent is extended or adjusted under 35 U.S.C. 154(b) by 0 days.

(21) Appl. No.: 09/786,106

(22) PCT Filed: Aug. 31, 1999

(86) PCT No.: PCT/GB99/02865
§ 371 (c)(1),
(2), (4) Date: Jul. 19, 2001

(87) PCT Pub. No.: WO00/12976

PCT Pub. Date: Mar. 9, 2000

(30) Foreign Application Priority Data

Aug. 28, 1998 (GB) .............................................. 9818678

(51) Int. Cl.[7] .............................................. G06F 19/00
(52) U.S. Cl. ......................................... 702/101; 177/50
(58) Field of Search ................................. 702/101, 104; 717/50; 73/293

(56) References Cited

U.S. PATENT DOCUMENTS 4,658,921 A * 4/1987 Karpa ......................... 177/50
5,606,516 A * 2/1997 Douglas et al. ............. 702/104
5,950,487 A * 9/1999 Maresca et al. .............. 73/293

FOREIGN PATENT DOCUMENTS

| GB | 515342 | 12/1939 |
|----|--------|---------|
| SU | 1415019 | 8/1988 |

* cited by examiner

*Primary Examiner*—John Barlow
*Assistant Examiner*—Xiuqin Sun
(74) *Attorney, Agent, or Firm*—Robert W. J. Usher

(57) ABSTRACT

A system for calibrating a plurality of weighing installations of the kind having a working configuration of at least one working load cell (14) with a fixed side and a load-bearing sides, a support (16) for the fixed side, and a load (12) operatively mounted on the load-bearing side, comprises portable apparatus moveable between installations to be calibrated, and fixed apparatus at each installation. The portable apparatus includes a reference load cell (30) and a fluid ram (32), the fixed apparatus includes anchorage means (22) fast with the working load cell support (16), and the reference cell and the ram are removably connectable between the anchorage means and the load-bearing side of the working load cell to apply calibrating loads to the working load cell in its working configuration. As many rams and reference cells may be provided as there are working load cells for any weighing installation.

17 Claims, 5 Drawing Sheets

DEVICE AND METHOD FOR CALIBRATING A WEIGHING APPARATUS

BACKGROUND OF THE INVENTION

1. Field of the Invention

This invention relates to calibrating weighing installations.

2. Description of Related Art

Installations such as weigh platforms or vessels (such as silos, tanks and hoppers) which are used in industrial processes for information and process control purposes usually have a working configuration of at least one working load cell, a support for a fixed side of the load cell, and a load mounted on a load-bearing side of the load cell. The load is usually transmitted to the working load cell through a vessel support bracket or other special bearing surface provided on the vessel, adapted to carry its weight and the weight of any contents. Typically, three or four working load cells, with corresponding supports and loads, are used in any one installation, so the aggregate load is the sum of all the separately measured loads. Some platforms and vessels use a mechanical arm system to transfer their weight to a single load cell. The term vessel will be used herein for convenience to include all receptacles, containers, platforms or the like for supporting whatever is to be weighed by a weighing installation.

Such installations need to be calibrated and re-calibrated from time to time, because of drift or creep in the electrical or mechanical properties of the load cells, or in the tare of the weigh platform or vessel. It is not usually practicable or good practice to remove the load cell or cells from the installation for re-calibration, because of the substantial impact this will make on the availability of the installation. In an industrial process, it normally would mean production downtime. Instead, the usual method adopted is to load the installation with a standard weight, which is compared with the total weight indicated by the working load cells. This indicated total weight is conventionally the single integrated or summated output of all load cells combined. Conventional weighing calibration is the calibration of the whole system, including all load cells, sources and measures of applied excitation voltage to the load cells, and meters for interpreting the corresponding load cell output signals. A necessary consequence is that, if any part of this system fails or is adjusted or replaced, the whole system must be recalibrated.

The use of standard weights can be time-consuming, dangerous and inaccurate. Considering that this invention is particularly devised for use with weight vessels typically ranging from 250 kg to over 100,000 kg capacity, the limitations of using dead weights of known value, especially at the higher end of this range, will be clear. In the case of tanks, metered quantities of water can be used, calculating weights from the known volumes and density, but it is known that flow meters are of limited accuracy. Loading a vessel with known weights may not be possible over the full capacity of the vessel, so that calibration of the maximum load is dependent upon extrapolation from lower loads, but the calibration curve may not in fact be linear, uniform or regular.

However, although such methods are conventionally used, they still imply a substantial interruption in the normal operation of the weighing installation, which can be especially costly if it is normally in use in a continuous industrial process.

BRIEF SUMMARY OF THE INVENTION

It is an object of the invention to provide an alternative system and method for calibrating weighing installations of the above kind, which enable calibration to be carried out quickly and accurately.

The present invention concerns aspects of the system for calibrating weighing installations described below. The scope of the invention extends to all novel aspects of the system, including methods of putting it into effect, whether individually or in combination with any of the other features disclosed herein.

More specifically, in one aspect of the invention, a system for calibrating weighing installations of the aforementioned kind comprises portable apparatus movable between installations to be calibrated, and fixed apparatus at each installation to be calibrated, wherein the portable apparatus includes a reference load cell and a fluid ram, the fixed apparatus includes anchorage means fast with the working load cell support, and the reference cell and the ram are removably connectable between the anchorage means and the load-bearing side of the working load cell to apply calibrating loads to the working load cell in its working configuration.

The fixed elements of the calibration system need be no more than the anchorage means only, at each working load cell support. The working load cells, which generally tend to be shear beams of one design or other, normally rest on load plates. The anchorage means can with advantage be incorporated into each load plate. Alternatively, the anchorage means can be provided on the solid base to which the load plates themselves are fastened. The anchorage may be mechanical, or electromagnetic, in which case a ferromagnetic material may be provided as the anchorage means, to be engaged by electromagnets in the portable apparatus.

The anchorage means are desirably close to the working load cells. It is in practice unlikely that the calibrating loads will be applied directly to the working load cell, because its load-bearing side is already carrying the weigh vessel. The calibrating load is accordingly applied to the weigh vessel itself, and it is generally convenient to apply those loads to the parts of the structure that are designed to take and transmit loads, which will normally be adjacent the point at which the weigh vessel is mounted on the working load cell, for example at an existing mounting bracket.

The portable elements in the system include the fluid ram, normally a hydraulic ram, and the reference load cell, and may also include supplementary fixings, for example a cradle to fasten to the anchorage means and hold the ram and reference cell in a proper position to exert calibrating loads on to the working load cell. Preferably, position adjustment means are included in the portable elements, to permit the reference cell to be properly positioned in relation to the working cell in different weighing installations, in which the anchorage means may not be identically positioned in relation to the working cells.

The reference cell should be accurate and may be periodically standardised by secondary referents traceable to an appropriate ultimate standard.

In a method in accordance with the invention, corresponding to the use of the system described above, the reference cells and the ram are connected between the anchorage means and the load-bearing side of the working load cell of each installation in turn, and calibrating loads are applied to each working load cell in its working configuration.

In the common case where a weighing installation has more than one working load cell, the portable apparatus may have as many reference load cells and fluid rams as are necessary to apply calibrating loads to each one of the plurality of working load cells in its working configuration—usually simply one reference cell and one ram for each working load cell. This enables faster calibration. It also enables calibration of each load cell selectively as the sole cell to which a load is applied, or while other loads are applied to other cells, or, in a more natural working condition, while similar loads are applied to the other cells, so that the loads are balanced between the working cells. Accordingly, the portable apparatus may include means for supplying fluid under pressure to the fluid ram associated with each one of the plurality of reference load cells, means for recording each calibrating load applied thereto as measured by the reference load cells, and means for recording the corresponding output of the working load cells to provide a calibration record. The method of the invention may be applied accordingly, Likewise, the system of the invention may include control means for varying the pressure of the fluid supplied to the rams whereby to control the force exerted by a given ram on the corresponding reference and working load cells in a sequence of calibration steps for each working load cell, and may include switch means for diverting fluid to the ram or rams associated with each of the plurality of reference load cells in turn, and for selecting the outputs of the corresponding load cells for recording, with corresponding applications of the method of the invention.

BRIEF DESCRIPTION OF THE SEVERAL VIEWS OF THE DRAWINGS

Embodiments of the invention are illustrated, by way of example only, in the accompanying drawings, in which.

DETAILED DESCRIPTION OF THE INVENTION

Figure 1:
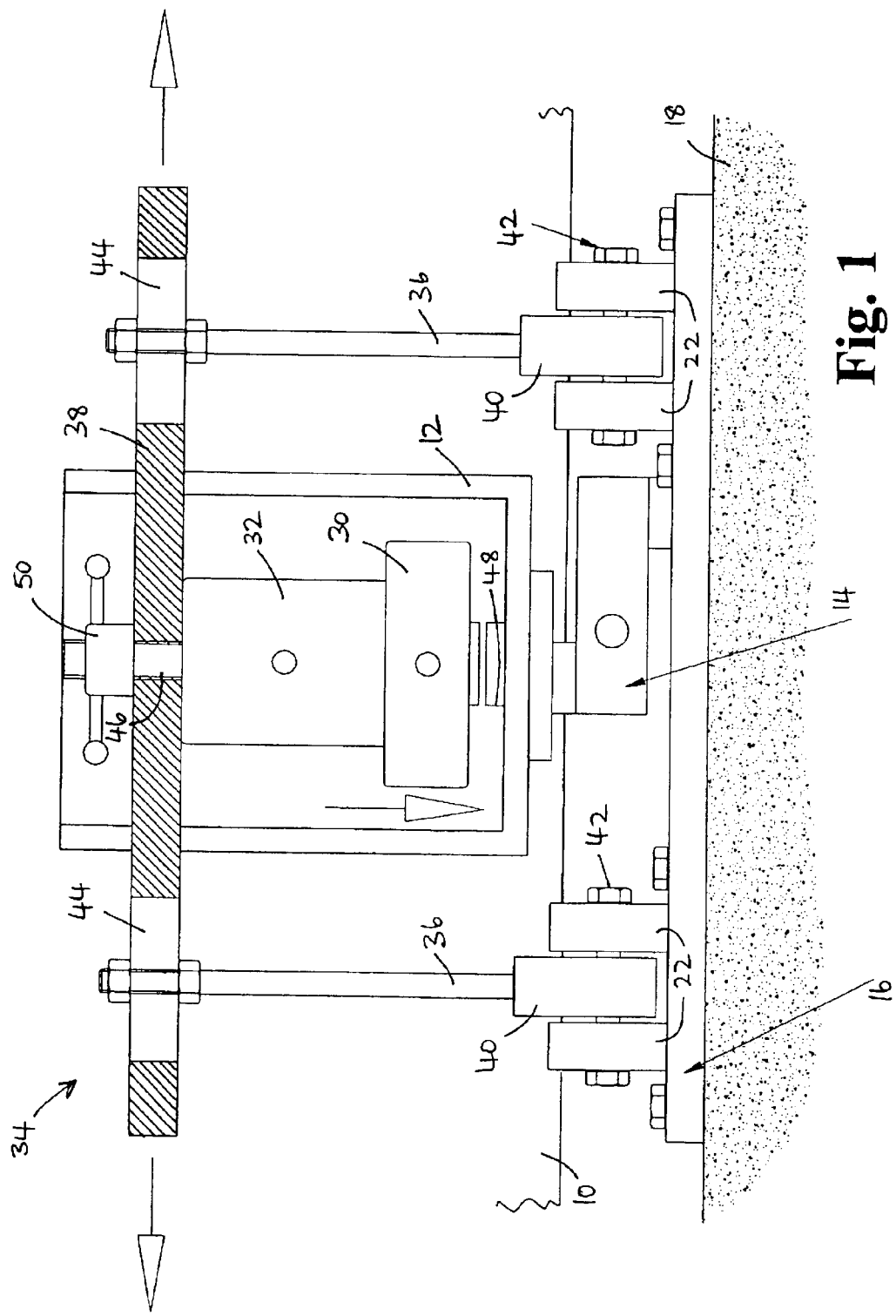
FIG. 1 is a front elevation of a system in accordance with the invention, with a cross beam shown in section.
Figure 2:
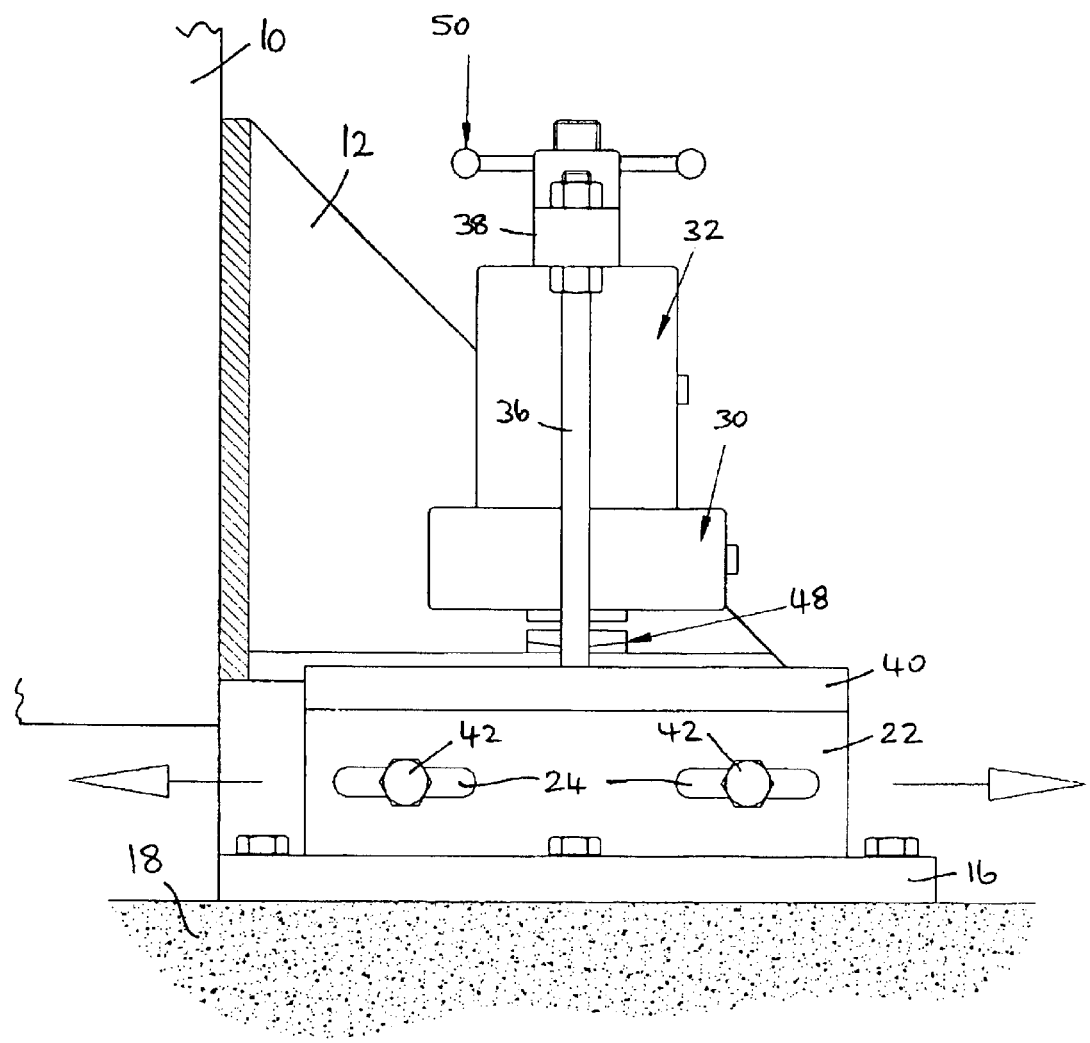
FIG. 2 is a side elevation of the system, one face of a weigh vessel support bracket having been cut away for clarity.

FIGS. 1 and 2 of the drawings show the system of the invention as applied at one weighing station of a permanent weighing installation for measuring loads carried by a vessel 10, provided with, typically, three or four such weighing stations. At each weighing station the vessel is supported by a rigid bracket 12, which rests on a cantilever shear beam working load cell 14. This in turn is mounted on a load plate 16, bolted to a concrete beam 18 which is part of the permanent structure carrying the weigh vessel.

In accordance with the invention, anchorage means are provided which are fast with the working load cell support. The anchorage means comprise two pairs of parallel upstanding steel webs 22 welded to the load plate 16 on either side of the load cell 14. The webs are pierced with slots 24.

The pierced webs provide an anchorage that is fast with the working load cell support. Similar anchorages are provided in association with each working load cell, so that the portable apparatus, described below, can be used to calibrate each working load cell in turn.

The principal elements of the portable apparatus are a reference load cell 30, and a hydraulic ram 32. The ram presses the reference load cell downwardly against bracket 12 supported on working load cell 14. In order to do this, a cradle 34 is provided. The cradle includes typically two tie bars 36 joined by a cross beam 38. For greater loading capability, additional tie bars may be used, eg four in total. Each tie bar extends upwardly from a base 40 which is retained between a respective one of the pairs of anchorage webs 22 by means of bolts or pins 42 in the slots 24. The upper ends of tie bars 36 are retained in slots 44 in the cross beam. A vertical hole 46 through the centre of the cross beam provides an attachment point for ram 32. By virtue of the slots 24 and 44, which extend at right angles to one another, the horizontal position of the ram can be adjusted until it is exactly over the load bearing region of load cell 14.

A spherical male/female self-levelling washer combination 48 is located between the reference load cell 30 and the upper surface of bracket 12 against which it will bear, to accommodate any small misalignment between the portable apparatus and the surface of the bracket. It may be beneficial to incorporate a level bubble in cross beam 38, to assist in setting up the portable apparatus with ram 32 vertical.

The reference load cell 30 is suitably a pancake load cell, in which a central core, over combination washer 48, is supported by shear webs from an outer rim, which is acted upon by ram 32.

An adjusting screw 50 is provided to give fine adjustment to the vertical position of reference load cell 30. Desirably, the screw is used to back the reference cell off from bracket 12 in order to prove the zero load, with the vessel empty.

It can thus be seen that the loadings applied to working load cells 14 by hydraulic ram 32, held down by tie bars 36 anchored to load plate 16, can be accurately measured by reference cell 30 and used to calibrate working cell 14.

As illustrated, the cradle 34 is part of the portable apparatus. However, if fixed in position at each working load cell location, a corresponding cradle could be provided as part of the fixed apparatus, for example if the portable apparatus were required to be used in a variety of locations in which a single cradle design would not be sufficiently adaptable. Furthermore, in some weigh vessel designs, the bracket 12 could be configured in relation to the fixed vessel support structure that the ram and reference cell could act between the anchorage means and the working cell without the need for any intermediate connecting member such as the cradle. In effect, the cradle itself then provides the anchorage means fast with the working load cell support. The relative positions of the reference load cell and the ram can of course be varied to adapt to the physical space available.

Figure 3:
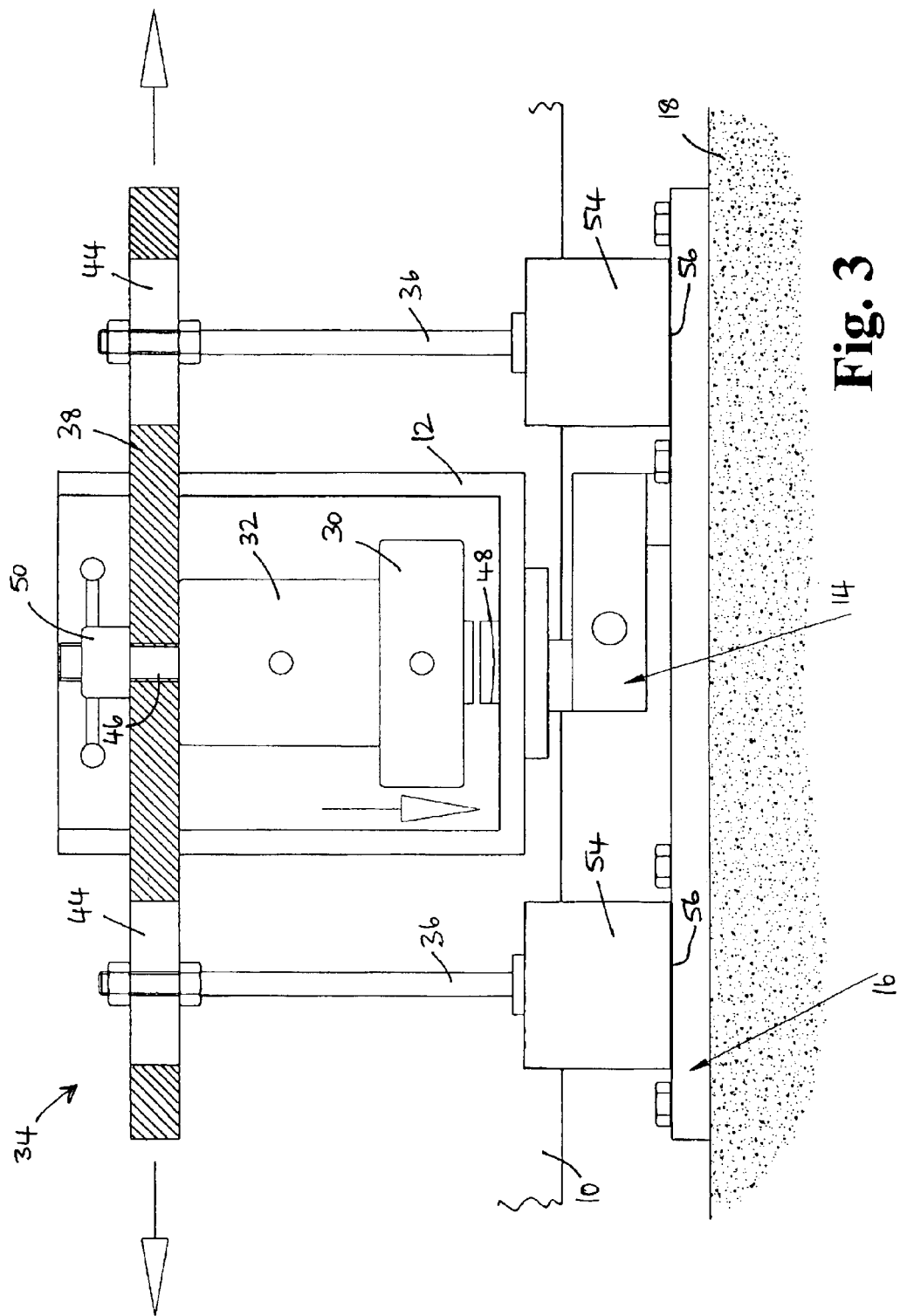
FIG. 3 is a front elevation of a modification of the system shown in claim 1, with a different anchorage.

FIG. 3 shows a modification in which the tie bars 36 are anchored to load plate 16 by electromagnetic means. These comprise flat faced electromagnets 54, which when energised grip flat areas 56 of the load plate 16. At least the flat areas 56 are accordingly of ferromagnetic material to ensure sufficient magnetic coupling. The respective flat areas could be of other mutually complementary conformations if circumstances required it.

As a matter of economics, the fixed parts of the system, which are replicated at each working load cell with which the system is used, should use the least costly components, while the more costly components should as far as practicable be incorporated into the portable apparatus.

By providing a portable ram and reference cell, and pre-installed anchorage points at each working load cell location, weighing installations can be calibrated quickly and economically with minimal interference and disturbance to production weighing installations.

In a modification of the invention, irrespective of the presence of any working load cell, the portable apparatus of the system can be used to apply lifting force between anchorage means and a vessel in order to act as portable weighing apparatus, for intermittent or periodic weighing operations.

By applying a load through a reference cell directly to the working load cell or cells or vessel, it is not necessary to utilise pulleys, bearings or levers that introduce mechanical errors into the accuracy of the calibration, and the calibration apparatus can be made portable, as described, between vessels of different sizes and designs.

Figure 4:
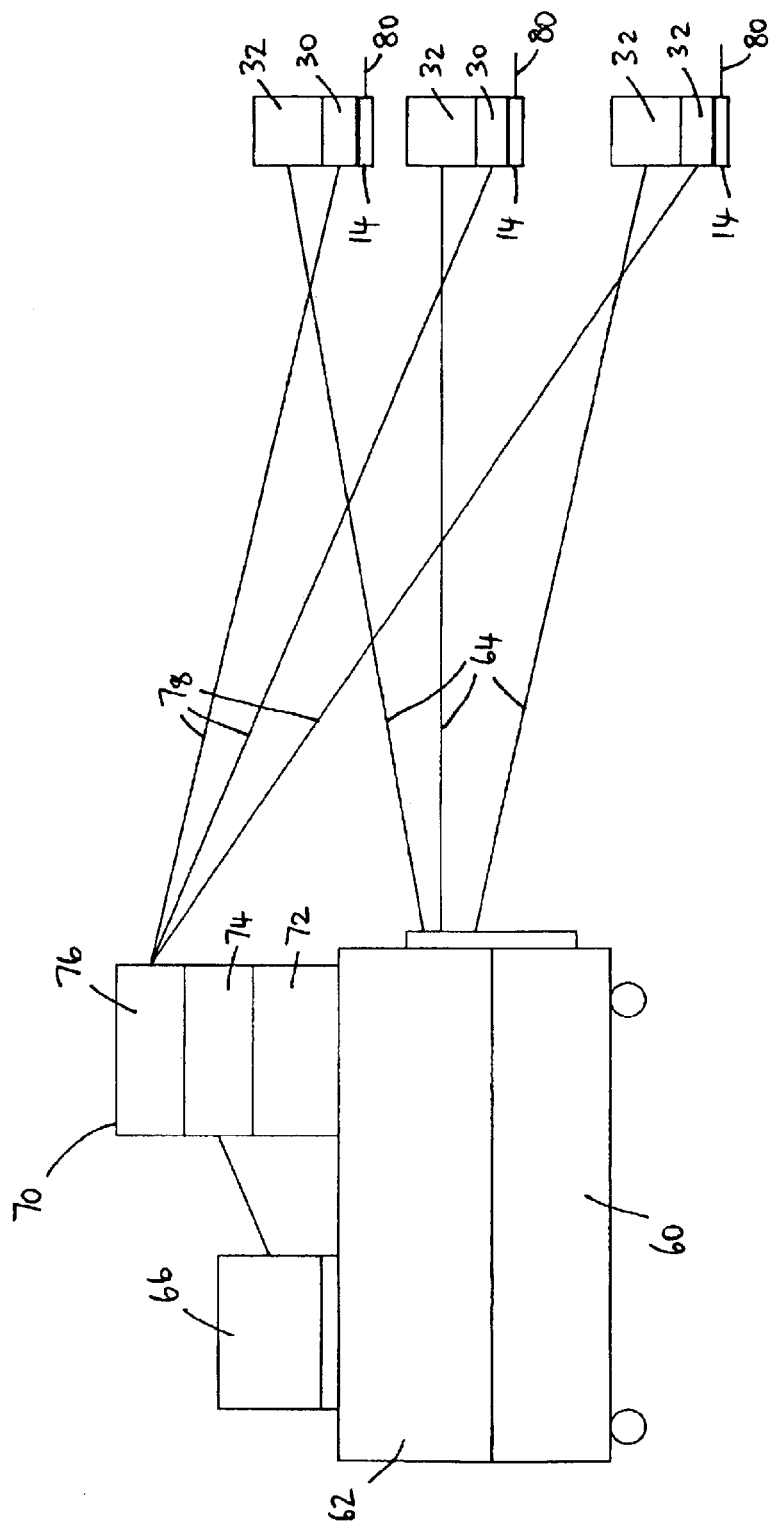
FIG. 4 is a diagram illustrating the use of the invention with a multi-cell weighing installation.
Figure 5:
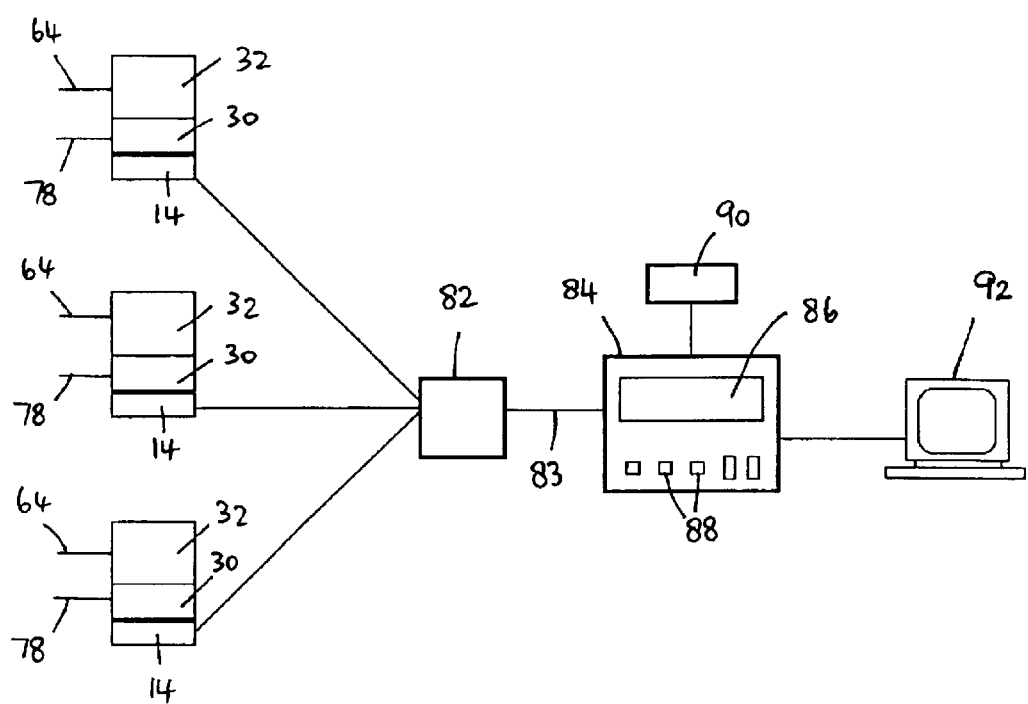
FIG. 5 is a diagram illustrating the application of the invention to the conventional elements of a multi-cell weighing installation.

FIGS. 4 and 5 illustrate the use of a system as illustrated in FIGS. 1 and 2 or FIG. 3.

A weighing vessel (not shown) is supported on three working load cells 14 spaced equally about its circumference, and controlled forces are applied to each load cell 14 by one hydraulic ram 32 acting through one reference load cell 30 at each cell 14, for example as described with reference to FIGS. 1 to 3.

The portable elements of the system, besides the three pairings of a ram 32 and a reference cell 30, comprise equipment carried by a mobile wheeled trolley 60, and connecting lines 64 and 78.

Trolley 60 carries a hydraulic power unit 62, which includes a conventional hydraulic pump and reservoir, connected by hydraulic hoses 64 to the respective rams 32 for applying calibrating loads to the respective working load cells in their working configurations. The trolley includes a computer 66, which is provided with simple control software to enable an operator to input commands and observe and record the outcomes, at a conventional keyboard and screen and disk drive or other input and output and storage devices as may be found appropriate for any given case. In particular, computer 66 records each calibrating load applied to the reference load cells as measured by them, and records the corresponding outputs of the working load cells. This last may be input manually, from an operative's observation of a display of the measured load, or directly, by a suitable connection (such as a serial data connection) to the weighing indicator 84, see below with reference to FIG. 5. Computer 66 is operatively connected both to the hydraulic power unit and an instrument housing 70. The hydraulic power unit includes switch means for diverting fluid to the rams 32 in turn, and is controlled by the computer 66 to vary the pressure of the fluid supplied to the rams to control their force in a sequence of calibration steps for each working load cell. The instrument housing 70 contains an electrical power supply 72, a digital volt meter 74 and a channel scanner 76. The channel scanner is a switch that distributes excitation voltages to the respective reference load cells 30, and performs data acquisition from those cells, through multicore electrical cables 78, in synchrony with the operation of the rams 32.

Although FIG. 4 shows three reference cells to be calibrated, the equipment carried by trolley 60 is sufficient to supply hydraulic fluid to up to eight rams, and to communicate through up to eight channels, corresponding to up to eight working load cells in a weighing installation.

Each working load cell has its normal input/output multicore cable 80. These are part of the permanent weighing installation at this site, and conduct the excitation voltage to, and output signal from, each working load cell. The respective cables 80 are combined at junction box 82, which is connected by a single multicore cable 83 to weighing indicator 84. This is a standard item of equipment and comprises in particular a display screen 86 and a number of manual controls 88. It is provided with a power supply 90, and communicates with one or more additional output devices 92, which may include control room and other slave displays and data supply for other data users, in particular may include data for the computer 66 for use during calibration, and data for other control and recording functions when the weighing installation is part of an industrial production process.

It will be seen that all the permanent and fixed elements of the weighing system are shown in FIG. 5, and all the portable elements are shown in FIG. 4. Essentially, in accordance with the invention, one set of the portable elements can be used with numerous different fixed weighing installations. After calibration is completed, the hoses 64 and cables 78 are disconnected and the rams 32 and reference cells 30 are removed from the anchorage means adjacent each reference load cell 14. These can be stored for convenience in trolley 60, which can then be moved to another site, and the apparatus reassembled.

The actual calibration process can be carried out in a number of ways. In a typical case, the weigh vessel is first emptied, and all readings are set to zero. Then, pressure is applied through hoses 64 to each ram 32 in turn, preferably to a convenient round figure force exerted through reference cell 30. Examples might be steps of 250 kg up to 3,000 kg, according to the capacity of the vessel and the working load cells. Obviously, the reference cells will be chosen to have an appropriate operative range. As the loads are imposed on each working load cell in turn, channel scanner 76 ensures an appropriate excitation voltage supply to the reference load cell 30, and digital volt meter 74 records the corresponding output, which is interpreted as a force by computer 66. This is possible because computer 66 has been loaded with all relevant data for the individual reference load cells 30, which will have been standardised against a prime standard at periodical intervals. Likewise, the applied voltage and the output voltage will be measured by periodically standardised equipment.

In this way, a calibration curve can be built up for each working load cell 14, by comparing the applied load as determined by the portable apparatus with the indicated load shown on display screen 86. It is recommended to check the working load cells individually in order to determine whether any is defective. This would not show up on a conventional whole system calibration, but it can adversely affect accuracy if a solid load on the weigh vessel is off centre. The calibration can be repeated as often as required, in order to produce an average. The final calibration is carried out loading all working cells simultaneously, in order to provide the overall calibration of the installation.

Manual controls 88, which are provided as standard on typical weighing indicators 84, enable the indicator to be reset to display weights from the weigh vessel that are within an acceptable tolerance from the accurately determined weights known to be applied by the portable apparatus. After any adjustment of the response of the weighing indicator 84, it is permissible to run the calibration cycle again as a test of accuracy.

It will be appreciated that the system can equally be applied to the working load cells individually, or simultaneously, by simple adjustment to the controls. A calibration certificate can be produced, including information such as linearity, hysteresis, best fit straight line and repeatability. We have found that accuracies of within 1 part in 5000 are possible, using measuring elements all traceable to a primary standard source. Further, in contrast to the use of dead weights, calibration forces can be applied up to the full scale of the capacity of the weighing vessel.

Furthermore, in a weighing installation calibrated by means of the present invention, it is possible to replace individual reference load cells by other load cells previously calibrated, either at the same capacity or of a different capacity, and retain a fully traceable calibration system without the need to recalibrate the whole system after replacement of the reference load cells. In this way, working load cells giving a weigh vessel a full scale loading of say 10 tonnes can be calibrated by one set of reference load cells, and a weigh vessel with a full scale loading capacity of say 50 tonnes can then be calibrated without the need to recalibrate the whole system. Any defective part of the calibration system can be simply replaced by another similar part that has itself been tested against a standard.

It has been estimated that to calibrate ten conventional weigh vessels using dead weights, with one full scale calibration per vessel, might require the provision, movement and storage of the dead weights, three operations, and 120 man-hours of labour. In contrast, by using the systems and methods of this invention, the calibration can be completed by one operative, in 8 man-hours, achieving three full scale calibrations per vessel.

What is claimed is:

1. A system for calibrating a plurality of weighing installations of the kind having a working configuration of a plurality of working load cells each with a fixed side and a load-bearing side, supports for the fixed sides of the load cells, and a load operatively mounted on and distributed between the load-bearing sides of the load cells, comprising portable apparatus moveable between installations to be calibrated, and fixed apparatus at each installation to be calibrated, wherein, the fixed apparatus at each installation includes a plurality of anchorage means fast with each working load cell support, the portable apparatus includes as many reference load cells and fluid rams as are necessary to apply calibrating loads simultaneously to each of the plurality of working load cells in the working configuration of any of said installations, a source of fluid under pressure, and means for supplying fluid under pressure from the source simultaneously to the fluid rams associated with each one of the plurality of reference load cells, and the reference cells and the rams are removably connectable between the anchorage means and the load-bearing sides of the working load cells to apply calibrating loads to the working load cells in the working configurations of the installations, wherein the system is operable to calibrate each load cell selectively as well as simultaneously and, the portable apparatus includes switch means for diverting fluid to the ram or rams associated with each of the plurality of reference load cells in turn, and for selecting the outputs of the corresponding load cells for recording.

2. A system according to claim 1 wherein the support for the fixed side of the load cell comprises a load plate, and the anchorage means are incorporated into each load plate.

3. A system according to claim 1 wherein the support for the fixed side of the load cell comprises a load plate fastened to a solid base, and the anchorage means are provided on the solid base.

4. A system according to claim 1 wherein the anchorage means comprise two pairs of parallel upstanding webs on either side of the load cell, the webs having slots to provide an anchorage.

5. A system according to claim 1 wherein the anchorage means comprise flat areas of ferromagnetic material engageable by electromagnets carried by the portable apparatus.

6. A system according to claim 1 wherein the portable apparatus includes a cradle removably connectable to the anchorage means, holding the fluid ram in position to apply a calibrating load to the working load cell.

7. A system according to claim 6 wherein the cradle includes tie bars for engagement with the anchorage means joined by a cross beam to which the ram is attached.

8. A system according to claim 6 wherein the cradle includes position adjustment means to permit the reference cell to be properly positioned in relation to the working cell.

9. A system according to claim 1 wherein the calibrating load is transmitted to the working load cell through a part of a weigh vessel.

10. A system according to claim 9 in which the calibrating load is transmitted to the working load cell through a vessel support bracket.

11. A system according to claim 1 including a self levelling washer located between the portable apparatus and the load-bearing side of the working load cell.

12. A system according to claim 1 wherein the reference load cell is a pancake load cell in which a central core is supported by shear webs from an outer rim.

13. A system according to claim 1 wherein the portable apparatus includes means for recording each calibrating load applied to the working load calls as measured by the reference load cells, and means for recording the corresponding output of the working load cells to provide a calibration record.

14. A system according to claim 1 wherein the portable apparatus includes control means for varying the pressure of the fluid supplied to the rams whereby to control the force exerted by a given ram on the corresponding reference and working load cells in a sequence of calibration steps for each working load cell.

15. A method of calibrating a plurality of weighing installations of the kind having a working configuration of a plurality of working load cells each with a fixed side and a load-bearing side, supports for the fixed sides of the load cells, and a load operatively mounted on and distributed between the load-bearing sides of the load cells, comprising providing portable apparatus moveable between installations to be calibrated, and providing fixed apparatus at each installation to be calibrated, wherein the fixed apparatus at each installation includes a plurality of anchorage means fast with each working load cell support; and the portable apparatus includes as many reference load cells and fluid rams as necessary to apply calibrating loads simultaneously to each of the plurality of working load cells in the working configuration of any of said installations, and at each installation in turn, connecting the reference cells and the rams between the anchorage means and the load-bearing sides of the working load cells, and supplying fluid under pressure from a source on the portable apparatus to the fluid rams associated with each of the plurality of reference load cells whereby simultaneously to apply calibrating loads to each working load cell in the working configuration of the installation;

supplying fluid from the source to the rams associated with the reference load cells selectively as well as simultaneously when applying the calibrating loads to each working load cell at an installation and recording each calibrating load applied to the working load cells as measured by the reference load cells, recording the corresponding output of the working load cells to provide a calibration record and diverting fluid to the ram or rams associated with each of the plurality of reference load cells in turn, and selecting the outputs of the corresponding load cells for recording.

16. A method according to claim 15 comprising varying the pressure of the fluid supplied to the rams whereby to control the force exerted by a given ram on the corresponding reference and working load cells in a sequence of calibration steps for each working load cell.

17. A method according to claim 15 comprising the step of providing switch means for diverting fluid to the ram or rams.

* * * * *